L. BENDER.
ATTACHMENT FOR TREE GUARDS.
APPLICATION FILED FEB. 25, 1918.
1,292,999. Patented Feb 4 1919.
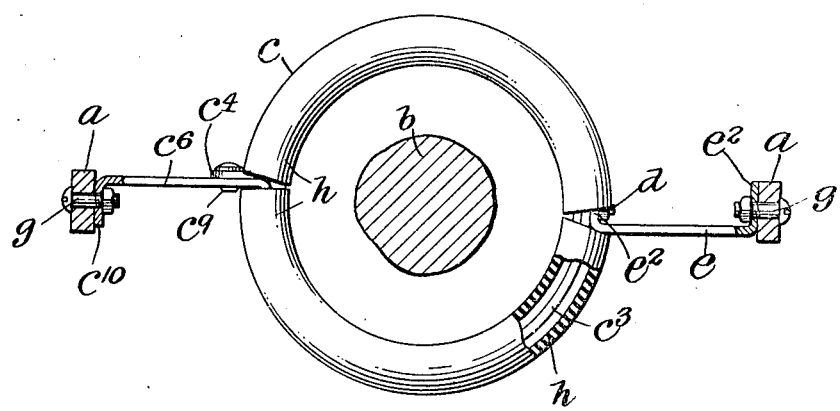
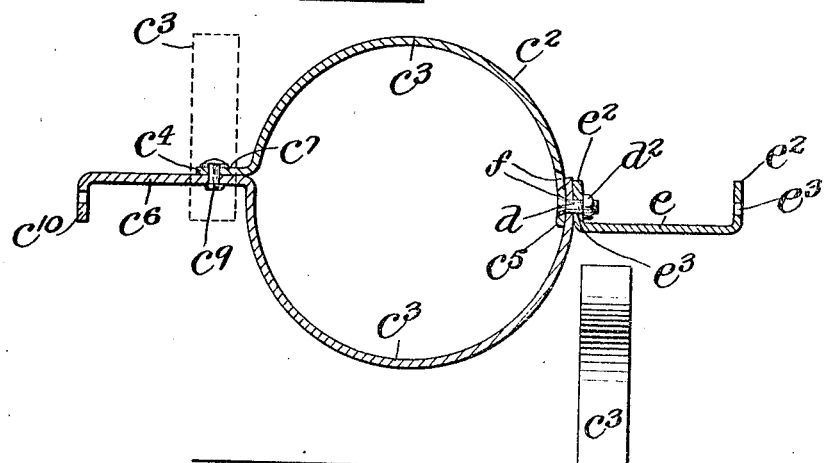
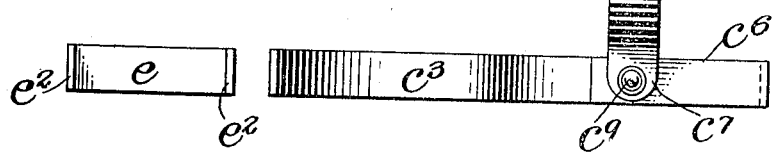
Inventor
Louis Bender
By his Attorneys

UNITED STATES PATENT OFFICE.

LOUIS BENDER, OF HOBOKEN, NEW JERSEY.

ATTACHMENT FOR TREE-GUARDS.

1,292,999.

Specification of Letters Patent.

Patented Feb. 4, 1919.

Application filed February 25, 1918. Serial No. 219,018.

*To all whom it may concern:*

Be it known that I, LOUIS BENDER, a citizen of the United States, and residing at Hoboken, in the county of Hudson and State of New Jersey, have invented certain new and useful Improvements in Attachments for Tree-Guards, of which the following is a specification, such as will enable those skilled in the art to which it appertains to make and use the same.

This invention relates to tree guards or boxes such as are usually employed for the purpose of protecting young trees in cities, towns and other places, and particularly to means for centering the body or trunk of a tree in the guard or box and preventing the said tree from coming in contact with the top of the guard or box, and the object of the invention is to provide a device of the class and for the purpose specified which is simple in construction, comparatively inexpensive and may be conveniently used wherever such devices are required.

The invention is fully disclosed in the following specification, of which the accompanying drawing forms a part, in which the separate parts of my improvement are designated by suitable reference characters in each of the views, and in which:—

Figure 1 is a view showing my improved tree guard attachment and indicating the method of its use, part of the construction being in section and part broken away;

Fig. 2 a similar view but showing only parts of the construction; and,

Fig. 3 a view at right angles to that of Fig. 2 and showing the parts in a different position.

In the accompanying drawing, I have shown at $a$ in Fig. 1, parts of the opposite sides of a tree guard or box and at $b$ the body or trunk of a tree and, in the practice of my invention, I provide an attachment $c$ for the tree guard or box and which is designed to center the tree in said guard or box and prevent it from coming in contact with the walls thereof.

The attachment comprises a circular body portion $c^2$ consisting of two similar arc-shaped parts $c^3$ composed preferably of metal, and these parts $c^3$, in the construction shown, are loosely connected at $c^4$ and detachably connected at the opposite sides as shown at $c^5$.

In the construction shown one of the parts $c^3$ is provided at one side with a radial arm $c^6$ and the other part $c^3$ is provided with a projecting jaw $c^7$ through which is passed a pivot pin $c^9$, whereby the movable connection $c^4$ is formed and the radial arm $c^6$ is provided with an angular foot piece $c^{10}$.

The parts $c^3$ are overlapped to form the connection $c^5$ and a bolt $d$ is passed outwardly through the overlapping end members of the parts $c^3$ and provided with a nut $d^2$, and a radial arm $e$ is also employed and provided with angular foot pieces $e^2$ having bolt holes $e^3$, and the bolt at $d$ is passed through one of the foot pieces $e^2$, as clearly shown in Fig. 1. That end of one of the parts $c^3$ through which the bolt $d$ is passed, is provided with a plurality of apertures $f$ through either of which said bolt may be passed, and in this way the dimensions of the circular body portion of the attachment may be adjusted or increased or decreased as will be readily understood.

In the use of this device the radial arm members $c^6$ and $e$ provide means whereby the attachment may be secured to the parts $a$ of the tree guard or box, and this connection may be made by means of bolts $g$ as in Fig. 1, and in placing the attachment so as to inclose the body or trunk of the tree, the connection of the parts $c^3$ at $c^5$ is broken by removing the bolt $d$, and one of the parts $c^3$ may be turned into the position shown in Fig. 3 of the drawing, and in dotted lines in Fig. 2, and after the attachment has been placed in proper position with reference to the trunk or body of the tree, the said parts $c^3$ are swung back into the position shown in Fig. 2 and the connection at $c^5$ of the parts $c^3$ is again made by means of the bolt $d$.

The circular body part $c$ formed of the parts $c^3$ is covered by a tubular cushioning casing $h$ of rubber or other suitable material, and composed of separate parts to prevent the body or trunk of the tree from being injured by coming in contact with the metallic parts of the attachment; said attachment when in use prevents the trunk or body of the tree from coming in contact with the guard or box.

My invention is not limited to the method herein described of loosely connecting the separate parts $c^3$ of the attachment at $c^4$, and this connection may be made in any desired way so as to permit the placing of the device in position for use, as indicated in Fig. 1; and changes in and modifications of the details of the construction herein set out may be made, within the scope of the appended claim, without departing from the spirit of my invention or sacrificing its advantages.

Having fully described my invention, what I claim as new and desire to secure by Letters Patent, is:—

An attachment for tree guards comprising two arc-shaped members one of which is provided with an integral arm or extension, the other of said members being pivoted to the radial extension of said first named member, the free end of one of said members being provided with an aperture, the free end of the other of said member being provided with a plurality of apertures, a device passed through the apertures in both of said members for detachably and adjustably connecting the same and an arm or extension detachably connected with the free ends of said members.

In testimony that I claim the foregoing as my invention I have signed my name, in presence of the subscribing witnesses, this 21st day of February, 1918.

LOUIS BENDER.

Witnesses:
C. E. MULREANY,
H. E. THOMPSON.

Copies of this patent may be obtained for five cents each, by addressing the "Commissioner of Patents, Washington, D. C."